US006277488B1

(12) United States Patent
Kobe et al.

(10) Patent No.: US 6,277,488 B1
(45) Date of Patent: Aug. 21, 2001

(54) ADHESIVE COMPOSITION CONTAINING A BLOCK COPOLYMER COMPOSITION AND POLYPHENYLENE OXIDE RESIN AND PRODUCTS THEREOF

(75) Inventors: James J. Kobe, Newport; David J. Yarusso, Shoreview, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/181,199

(22) Filed: Oct. 28, 1998

(51) Int. Cl.$^7$ ............... B32B 7/12; C08L 71/02
(52) U.S. Cl. ............... 428/354; 428/355 RA; 428/355 BL; 525/98; 525/99; 525/314
(58) Field of Search ............... 428/354, 355 RA, 428/355 BL; 525/98, 99, 314

(56) References Cited

U.S. PATENT DOCUMENTS

| | | | |
|---|---|---|---|
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 4,104,323 | 8/1978 | Hansen | 260/829 |
| 4,141,876 | 2/1979 | Hansen | 260/33.6 |
| 4,314,926 | 2/1982 | Allison, III | 260/33.6 |
| 5,028,646 | 7/1991 | Miller et al. | 524/77 |
| 5,412,032 | 5/1995 | Hansen et al. | 525/98 |
| 5,453,319 | 9/1995 | Gobran | 428/355 |
| 5,638,798 | 6/1997 | Guido et al. | 123/609 |
| 5,789,474 | 8/1998 | Lu et al. | 524/270 |
| 5,807,915 | 9/1998 | Chu et al. | 524/270 |

FOREIGN PATENT DOCUMENTS

| | | |
|---|---|---|
| 2 314 845 | 1/1998 | (GB) . |
| WO 90/14396 | 11/1990 | (WO) . |
| WO 90/14397 | 11/1990 | (WO) . |
| WO 97/11997 | 4/1997 | (WO) . |

OTHER PUBLICATIONS

"The Effect of Diblock on Carton Sealability of Packaging Tape", Minoru Ishiguro, Nippon, Tokyo, Japan, pp. 75–90; PSTC Technical Seminar Proceedings, 1995. (No month).

"The Effect of Diblock on Pressure Sensitive Adhesive Properties", Steven H. Dillman, Shell Development Co., Houston, TX, pp. 119–137; PSTC Technical Seminar Proceedings, 1991. (No month).

"Achieving High Service Temperatures With Thermoplastic Elastomers," G.R. Himes et al., Westhollow Technology Ctr., Houston, TX, pp. 71–98; Hot Melt Symposium, 1996. (No month).

Primary Examiner—Blaine Copenheaver
Assistant Examiner—Alicia Chevalier
(74) Attorney, Agent, or Firm—Gary L. Griswald; Lisa M. McGeehan

(57) ABSTRACT

A pressure sensitive adhesive composition comprising (a) a block copolymer composition comprising (i) a first component having a configuration of A-B, and (ii) a second component having a configuration of A-B-(B-A)$_n$ where n ranges from 1 to 20, wherein A is an alkenyl aromatic or arene hydrocarbon polymer and B is polybutadiene, and wherein the first component is present in an amount ranging from about 40 weight % to about 95 weight % based on a total weight of the block copolymer composition; (b) a polyphenylene oxide resin; and (c) a tackifier resin compatible with B.

24 Claims, No Drawings

US 6,277,488 B1

ADHESIVE COMPOSITION CONTAINING A BLOCK COPOLYMER COMPOSITION AND POLYPHENYLENE OXIDE RESIN AND PRODUCTS THEREOF

FIELD OF THE INVENTION

This invention relates to a pressure sensitive adhesive composition comprising a block copolymer composition with a particular diblock content in combination with a polyphenylene oxide resin, and a tackifier. The adhesive composition achieves a peel adhesion at room temperature along with a static shear performance at elevated temperatures that are particularly suited for applications involving low surface energy substrates and can be formulated as a tape or an attachment system for use in products such as mechanical fasteners.

BACKGROUND OF THE INVENTION

There exists a need in industry to improve the adhesion and elevated temperature performance of products (e.g., specialty tapes, hook and loop mechanical fasteners, and self-mating mechanical fasteners) to low surface energy (LSE) substrates. "Low surface energy substrate" refers to materials that generally have a surface energy of less than about 45 mJ/m$^2$, typically less than 40 mJ/m$^2$, or more typically less than 35 mJ/m$^2$. Examples of LSE substrates include some powder coatings and polyolefin polymers such as polypropylene (PP), low density polyethylene (LDPE), high density polyethylene (HDPE), and ultrahigh molecular weight polyethylene (UHMWPE). The relative low cost, improved properties, and increased usage of these polyolefin polymers has increased this need. The general rule for adhesives is that there is a tradeoff between peel adhesion and static shear performance. It is especially difficult to achieve the combination of high peel adhesion at room temperature and high static shear performance at elevated temperature. Designing a pressure sensitive adhesive (PSA) to have adhesion to LSE substrates has always been a challenge. Significant development efforts have concentrated on this problem. The challenge has been to develop products and/or systems which have high, consistent, and immediate adhesion to LSE substrates and have high temperature ($\geq 70°$ C. (158° F.)) static shear performance.

Acrylic adhesives can be formulated to have high temperature static shear performance, but generally have poor peel adhesion to LSE substrates. Tackified acrylic adhesives, in particular non-polar acrylates, such as those described in U.S. Pat. No. 5,638,798 (Bennett et al.), have good adhesion to some LSE substrates. However, these adhesives do not typically exhibit desired elevated temperature static shear performance, have difficulty adhering to HDPE, and have a noticeable acrylate odor.

Block copolymer adhesives can be designed to have good adhesion to LSE substrates and have low odor, such as those described in U.S. Pat. No. 5,453,319 (Gobran), but generally block copolymer adhesives have poor elevated temperature static shear performance. The general rule for adhesives stated above also applies to block copolymer adhesives, i.e., the higher the peel adhesion at room temperature, the lower the static shear performance at elevated temperatures.

U.S. Pat. No. 5,028,646 (Miller et al.) describes block copolymer pressure sensitive adhesive containing tackifier resins and preferably 2–20% by weight of an aromatic, essentially hydrocarbon, end block reinforcing resin, which generally has a glass transition temperature (Tg) higher than the service temperature of the adhesive, for refastenable diaper tape applications.

The addition of PPO to block copolymer adhesives to improve the temperature performance is known. For example, U.S. Pat. Nos. 4,104,323 (Hansen) and 4,141,876 (Hansen) disclose the addition of polyphenylene ether (also known as polyphenylene oxide ("PPO")) resin, having a viscosity average molecular weight ($M_{vis}$) of between about 6,000 and 25,000 Daltons (Da) and a glass transition temperature of between 170° C. and 200° C., to a block copolymer PSA to provide hot melt adhesive compositions and adhesive tapes having improved service temperature performance. However, these patents do not mention adhesion to low surface energy substrates.

WO 90/14396 (Audett) describes pressure sensitive and hot melt adhesive compositions having improved shear adhesion failure temperatures (SAFT) comprising a block copolymer having at least two monoalkenyl arene polymer endblocks (A) and at least one elastomeric conjugated-diene mid-block (B), said blocks (A) comprising 8–55% by weight of the block copolymer, about 50–200 phr mid-block tackifying resin, and 5–50 phr low molecular weight PPO polymer. The molecular weight ($M_{vis}$) of the PPO polymer is from about 1,000 to about 5,000 Da and the Tg is from about 100° C. to 165° C., preferably between 140 and 163° C. This application also generically describes a tape construction utilizing the adhesive composition. Utility of the adhesive for bonding LSE substrates is not specifically mentioned, but T-peel adhesion at room temperature of polyethylene (PE) to itself with the adhesive is reported as 0.0175 kN/m (0.1 lb/inch).

WO 90/14397 (Audett) describes improved shear adhesion failure temperatures (SAFT) adhesive compositions containing low molecular weight PPO similar to that of WO 90/14396. This application also generically describes tape constructions utilizing these adhesive compositions and substrates coated with these adhesive compositions. T-peel adhesion of 0.0175 kN/m (0.1 lb/in) for PE to PE is exemplified for one adhesive formulation.

WO 97/11997 (Chu) describes use of a polyphenylene oxide delivery system for increasing an upper service temperature of an A-B-A block copolymer adhesive composition. The delivery system comprises a preblend of about 5 to 45 parts by weight of a PPO resin having a Tg with the range of from about 150 to about 210° C. and from about 1 to 450 parts by weight of a B-block (i.e., mid block) compatible resin. This application also describes an adhesive formulation produced with the PPO/resin delivery system. The amount of PPO resin incorporated into the block copolymer adhesive ranges from about 6 to 30% by weight of the total elastomer weight in the formulation. This application also generically describes a tape construction utilizing this adhesive composition. Adhesion to LSE substrates is not mentioned.

U.S. Pat. No. 5,412,032 (Hansen) describes linear styrene-isoprene-styrene block copolymers with an overall molecular weight of above 280,000 up to 520,000 with lower coupling efficiencies to produce adhesive compositions which adhere strongly to difficult to adhere substances such as skin or polyolefins, for example, polyethylene.

It is also known that the use of block copolymers having an increasing diblock content in PSA formulations can improve tack and peel adhesion but generally at the expense of shear performance.

There still exists a need for improved adhesive compositions that bond to LSE substrates having high room temperature peel adhesion and high temperature static shear performance.

SUMMARY OF THE INVENTION

The pressure sensitive adhesive composition of the present invention, comprising a block copolymer composition with a diblock content ranging from about 40 weight % to about 95 weight %, based on the total weight of the block copolymer composition, in conjunction with PPO, gives rise to an unexpected combination of peel adhesion performance to LSE substrates and static shear performance at elevated temperatures.

In one embodiment, the present invention relates to a pressure sensitive adhesive composition comprising (a) a block copolymer composition comprising (i) a first component having a configuration of A-B, and (ii) a second component having a configuration of A-B-(B-A)$_n$ where n ranges from 1 to 20, wherein A is an alkenyl aromatic or arene hydrocarbon polymer and B is polybutadiene, and wherein the first component is present in an amount ranging from about 40 weight % to about 95 weight % based on a total weight of the block copolymer composition; (b) a polyphenylene oxide resin; and (c) a tackifier resin compatible with B.

The present invention also relates to a pressure sensitive adhesive composition comprising (a) a block copolymer composition comprising (i) a first component having a configuration of A-B, and (ii) a second component having a configuration of A-B-(B-A)$_n$ where n ranges from 1 to 20, wherein A is an alkenyl aromatic or arene hydrocarbon polymer and B is polyisoprene, and wherein the first component is present in an amount ranging from about 40 weight % to about 95 weight % based on a total weight of the block copolymer composition; (b) a polyphenylene oxide resin; and (c) a petroleum derived hydrocarbon tackifier resin compatible with B.

The pressure sensitive adhesive composition of the present invention can be used to form a tape. In addition, an article can be produced bearing the composition of the present invention. The invention also relates to a method for bonding a substrate using a composition of the present invention.

DETAILED DESCRIPTION OF THE INVENTION

The adhesive composition of the present invention comprises the components of a block copolymer composition, a polyphenylene oxide resin, and a tackifier. These components and the composition will be described in more detail below.

Block Copolymer Composition

Suitable block copolymer compositions of the present invention comprise a diblock component, i.e., a component having a block A and a block B, having a configuration of A-B, and a component having at least two polymer end blocks A and at least one polymer midblock B, that has a configuration of A-B-(B-A)$_n$ where n ranges from 1 to 20, preferably 1 to 3. Thus, the block copolymer composition of the present invention may include copolymers having a variety of geometric structures and can be linear, radial or branched.

Block A is typically an alkenyl aromatic or arene hydrocarbon polymer block having a weight average molecular weight of between about 2,000 and about 50,000 Da, preferably 9,000 to 35,000 Da. Block A may also contain minor proportions of other monomers such as conjugated dienes. Examples, for the purpose of the present invention, include styrene, its homologs and its analogs, such as alpha-methyl styrene, t-butyl styrene, 3-methylstyrene, 4-n-propylstyrene, 4-p-propylstyrene, 1-vinylnaphthalene, 2-vinylnaphthalene, and mixtures thereof.

Block B is typically an elastomeric polymer block of a conjugated diene having a weight average molecular weight of between about 20,000 and about 350,000 Da, preferably between 25,000 and 150,000 Da. Exemplary non-hydrogenated elastomeric polymer blocks include polybutadiene and polyisoprene, and copolymers thereof; and exemplary hydrogenated elastomeric polymer blocks include poly-co-ethylene butylene, poly-co-ethylene propylene, and copolymers thereof. Minor proportions, for example, less than about 10 weight % based on the total weight of block B, of other monomers may be included in the B blocks such as arenes or other conjugated dienes.

Block copolymer compositions of the present invention have a diblock content ranging from about 40 weight % to about 95 weight %, preferably 45 weight % to 95 weight %, more preferably 60 weight % to 95 weight %, most preferably 75 weight % to 90 weight %, based on the total weight % of the block copolymer composition. The desired diblock content may be obtained during polymerization by limiting the coupling efficiency or by combining one or more block copolymers with known diblock content in amount to achieve a block copolymer mixture with the desired diblock content as described in U.S. Pat. No. 5,412,032, which is incorporated herein by reference.

The total weight % of block A can vary and is typically 8 to 55 weight %, preferably 10 to 30 weight %, based on the total weight % of the block copolymer composition, provided that the desired diblock content is present in the block copolymer composition.

Suitable block copolymers include those in which block A and block B pairings are polystyrene-polybutadiene, polystyrene-polyisoprene, polystyrene-poly-co-ethylene butylene, polystyrene-poly-co-ethylene propylene, poly(alpha-methylstyrene)-polybutadiene, poly(alpha-methylstyrene)-polyisoprene, or mixtures thereof. Commercially available examples that have a diblock content either within the range of the present invention or that can be blended to achieve a diblock content within the range of the present invention include those available from Shell Chemical Company, Houston, Tex., under the trade designations "Kraton D1113", "Kraton D1118" and "Kraton D1119", those available from Housemex Inc., Houston, Tex., under the trade designations "Solprene 1205", and those available from Nippon Zeon Company Ltd, Tokyo, Japan, under the trade designation "Quintac SL-113".

Particularly suitable block copolymer compositions include:

(a) a blend of about 5 to 50 parts of a linear styrene butadiene (SB) block copolymer with a styrene content ranging from about 20 to 35% and a diblock content ranging from 0 to 20% with 50 to 95 parts of a linear styrene butadiene (SB) block copolymer with a styrene content ranging from about 20 to 35% and a diblock content ranging from 80 to 100%, (b) a blend of about 34 to 75 parts of a linear styrene butadiene (SB) block copolymer with a styrene content ranging from about 20 to 35% and a diblock content ranging from 60 to 85% with 25 to 66 parts of a linear styrene butadiene (SB) block copolymer with a styrene content ranging from about 20 to 35% and a diblock content ranging from 80 to 100%, and (c) a blend of about 50 to 75 parts of a linear styrene butadiene (SB) block copolymer with a styrene content ranging from about 20 to 35% and a diblock content ranging from 60 to 90% with 25 to 50 parts of a linear styrene butadiene (SB) block copolymer with a styrene content ranging from about 20 to 35% and a diblock content ranging from 80 to 100%.

The block copolymers of the present invention can be prepared by any known suitable methods. Exemplary methods of preparation are disclosed in, for example, U.S. Pat. Nos. 5,453,319. Notably, the structure of the block copolymer is determined by the methods of polymerization.

The block copolymer composition of the present invention is typically present in the pressure sensitive adhesive composition in an amount ranging from about 25 to about 65 weight %, preferably 35 to 50 weight %, based on the total weight of the adhesive composition.

Polyphenylene Oxide Resin

A polyphenylene oxide resin useful in the present invention are those with the following repeating unit:

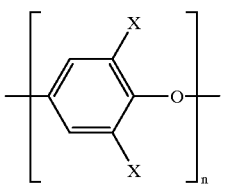

wherein the oxygen ether atom of one unit is connected to the benzene nucleus of the next adjoining unit, n designates repeating units and each X is independently a monovalent substituent selected from the group consisting of hydrogen, halogen, hydrocarbon radicals, halohydrogen radicals having at least two carbon atoms between the halogen atom and the phenyl nucleus, hydrocarbonoxy radicals, and halohydrocarbonoxy radicals having at least two carbon atoms between the halogen atoms and phenyl nucleus. Preferred polyphenylene oxide resins are those where X is methyl.

Useful polyphenylene oxide resins have a glass transition temperatures (Tg) and a molecular weight selected to be compatible with the block copolymer composition used, as described in Himes et al. "Achieving High Service Temperatures With Thermoplastic Elastomers" 1996 Hot Melt Symposium, pages 71–98, which is herein incorporated by reference. Typically the polyphenylene oxide resins have a Tg of between about 110 to 210° C., preferably 140 to 170° C., more preferably 140 to 165° C., as determined by differential scanning calorimetry and a weight average molecular weight (Mw) ranging from about 1,000 to about 25,000 Da, preferably 2,000 to 10,000 Da, more preferably 4,000 to 8,000 Da.

Polyphenylene oxide resin can be prepared as described in U.S. Pat. Nos. 3,306,874 (Hay); 3,306,875 (Hay); 3,257,357 (Stamatoff); and 3,257,358 (Stamatoff).

A polyphenylene oxide resin is typically present in the adhesive composition of the present invention in an amount ranging from about 10 to about 200 parts, based on 100 parts by weight of block A in the block copolymer composition.

Tackifier Resin

A tackifier resin is added as a component to the adhesive composition of the present invention and shall mean a material which is miscible with block B and has a number average molecular weight (Mn) of 10,000 Da or less and a glass transition temperature (Tg) of −30° C. or more as measured by differential scanning calorimetry.

Tackifiers useful in the present invention include rosin and rosin derivatives, hydrocarbon tackifier resins, aromatic hydrocarbon resins, aliphatic hydrocarbon resins, terpene resins, etc. Commercially available examples include alpha-pinene resins, available from Hercules Inc., Wilmington, Del. under the trade designation "Piccolyte A135" or "Piccolyte A115" or available from Arizona Chemical Division, International Paper, Panama City, Fla. under the trade designation "Zonarez A25"; beta-pinene resins, available from Hercules Inc., Wilmington, Del. under the trade designation "Piccolyte S135" or "Piccolyte S115"; or petroleum derived hydrocarbon resin, available from Goodyear Tire & Rubber Co., Chemical Div, Akron Ohio under the trade designation "Wingtack Plus".

Typically, the tackifier resin is present in the adhesive composition in amounts ranging from about 20 to about 80 weight %, preferably 40 to 60 weight %, based on the total weight % of the adhesive composition.

Adhesive Composition

The adhesive composition of the present invention is a pressure sensitive adhesive which is defined as an adhesive composition that satisfies the Dahlquist criteria, i.e., a one second creep compliance greater than $1 \times 10^{-6}$ cm$^2$/dyne, at the intended application temperature, as defined in Handbook of Pressure Sensitive Adhesive Technology, p. 172, D. Satas (ed.), Van Nostrand, N.Y., (1989). Typically, a pressure sensitive adhesive is normally tacky at room temperature and adheres to a surface upon contact to the surface without the need for more than finger or hand pressure.

The adhesive composition may also include additives such as fillers, stabilizers, antioxidants, and pigments for the conventional purpose of these additives.

End block associating resins such as aromatic hydrocarbon resins, for example, "Endex 160" commercially available from Hercules Inc., Wilmington, Del., may also be added. Typical amounts of end block associating resin range from 0 to 200 parts per 100 parts by weight of block A of the block copolymer composition. The amount of PPO may be adjusted based on the amount of end block associating resin used.

An oil may also be added as a component of the adhesive composition of the present invention. This oil may serve to modify the viscosity of the adhesive composition and increase the tackiness of the composition. Typically, the oil is added in an amount ranging from about 0 to about 35 weight %, based on the total weight of the adhesive composition. Suitable oils, typically referred to as paraffinic/naphthenic oils, are usually fractions of refined petroleum products and have less than about 30% by weight aromatic components as measured by clay-gel analysis. Commercially available oils include those from Shell Chemical Company, Houston, Tex., under the trade designation "Shellflex 371N" and "Shellflex 6371".

A particularly suitable adhesive composition of the present invention comprises a blend of about 5 to 50 parts by weight of a linear styrene butadiene (SB) block copolymer with a styrene content ranging from about 20 to 35% and a diblock content ranging from 0 to 20% with 50 to 95 parts by weight of a linear styrene butadiene (SB) block copolymer with a styrene content ranging from about 20 to 35% and a diblock content ranging from 80 to 100%, and alpha-pinene tackifier resin with a softening point greater than 110° C., a napthenic oil, and a polyphenylene oxide resin. In this composition, the amount of tackifier resin may range from 75 to 150 parts by weight, the amount of oil may range from 0 to 50 parts by weight, and the amount of polyphenylene oxide resin may range from 2 to 40 parts by weight.

Another particularly suitable adhesive composition of the present invention comprises either a blend of about 34 to 75 parts of a linear styrene butadiene (SB) block copolymer with a styrene content ranging from about 20 to 35% and a diblock content ranging from 60 to 85% with 25 to 66 parts of a linear styrene butadiene (SB) block copolymer with a styrene content ranging from about 20 to 35% and a diblock content ranging from 80 to 100%, or a blend of about 50 to 75 parts of a linear styrene butadiene (SB) block copolymer with a styrene content ranging from about 20 to 35% and a diblock content ranging from 60 to 90% with 25 to 50 parts of a linear styrene butadiene (SB) block copolymer with a styrene content ranging from about 20 to 35% and a diblock content ranging from 80 to 100% and alpha-pinene tackifier resin with a softening point greater than 110° C., a napthenic oil, and a polyphenylene oxide resin. In this composition, the amount of tackifier resin may range from 75 to 150 parts, the amount of oil may range from 0 to 60 parts, and the amount of polyphenylene oxide resin may range from 2 to 40 parts.

The pressure sensitive adhesive composition of the present invention may be hot melt compounded and coated. In this method, the components of the adhesive composition are melt-blended in a mixer such as a twin screw extruder. The polyphenylene oxide resin may be added as a premix with the tackifier resin or an oil or an end block associating resin, if present. The preblending can be carried out as described in WO 97/11997 or U.S. Pat. No. 4,104,323.

Alternatively, the adhesive compositions may be prepared by dissolving the components of the adhesive composition in a solvent such as toluene and casting over a substrate such as a polyester film or release liner.

When the adhesive composition comprises a block copolymer where block B is hydrogenated, the composite midblock glass transition temperature (CMTg) of the adhesive composition is greater than 245 Kelvin (K), as calculated using the Fox Equation by measuring the Tg of block B and the Tg of all midblock compatible components such as the midblock compatible tackifier resin and oil using differential scanning calorimetry.

The Fox Equation is:

$$\frac{\sum_i w_i}{CMTg} = \sum_i \frac{w_i}{T_{gi}}$$

wherein $w_i$ is the weight fraction of component i and $T_{gi}$ is the glass transition temperature of component i and the summation is take over the components which are miscible with block B and the block B itself.

The adhesive composition preferably achieves a 70° C. (158° F.) static shear performance of holding 250 grams for 10,000 minutes or greater, or 1,000 grams for 1,000 minutes or greater, per 6.45 square centimeters (one square inch) load where the adhesive composition is coated at a thickness of 0.1 mm and tested according to the Static Shear Strength test method.

The adhesive composition of the invention can be coated onto a substrate. Examples of suitable substrates include release liners (e.g., silicone release liners) and tape backings (which may be primed or unprimed paper, metal, or plastic).

Where multi-layer tape constructions are desirable, one method of construction is multi-layer coating using conventional techniques. For example, the coating may be applied concurrently (e.g., through a die coater). The coatings may also be applied sequentially.

The adhesive composition of the invention can also be made as a tape construction which comprises a layer of adhesive composition evenly coated between two liners at least one of which is coated with a release material. A transfer tape can be made by coating the adhesive composition between two liners both of which are coated with a release coating.

The adhesive compositions of the invention can also be coated onto a differential release liner, i.e., a release liner having a first release coating coated on one side of the liner and a second release coating coated on the opposite side of the liner.

When a transfer tape is made, one of the liners of the transfer tape can be removed and the exposed adhesive surface can be laminated to another substrate such as a backing. The remaining release liner aids in transferring the adhesive to the substrate. The substrate can be of any of the typical substrates used for tapes such as those selected from the group consisting of polymeric films (e.g., polyester, polypropylene, polyurethane) metal foils, glass cloth, paper, cloth, nonwoven materials, foam sheets, and the like. Foam sheets are known in the industry and include open and closed cell foams made from polyethylene, polyurethane, acrylates, polystyrene, neoprene, silicone, and the like.

Other tape constructions in which the pressure sensitive adhesives according to the invention are useful include mechanical fasteners such as a fastener available under the trade designation "Dual-Lock" from Minnesota Mining and Manufacturing Co. (3M), St. Paul, Minn., and a fastener available under the trade designation "Scotchmate" from Minnesota Mining and Manufacturing Co. (3M), St. Paul, Minn. The pressure sensitive adhesives are also useful in vibration damping applications. Further, the pressure sensitive adhesives can be used as a tape attachment system for gaskets or molded parts such as bumpers or cushioning products.

The adhesive composition of the present invention may also be used in a method of bonding a substrate, for example, a polyolefin substrate, where the method comprises providing the substrate, and applying the adhesive composition of the present invention to the substrate using methods and techniques well understood by one skilled in the art. Another substrate can then be contacted to the adhesive composition. In the instance where the substrate is a polyolefin, the substrate may be unmodified. The term "unmodified" means that the substrate has not been subjected to any chemical or physical treatment.

EXAMPLES

Test Methods

The following test methods were used to measure the various test results reported in the examples. All amounts are in parts by weight unless specified otherwise.

90 Degree Peel Adhesion

This test was run according to PSTC-5 using various rigid substrates to which the 2.5 cm×15 cm (1 inch×6 inch) test tape was applied using a 2-kg hard rubber roller, one pass in each direction. Samples were allowed to dwell for the time specified below at room temperature before being separated at a rate of 30 cm/minute (12 inches/minute). The value reported was the average value of two replicates unless otherwise noted.

The result of peel force oscillating in a periodical manner between a higher and lower peel force value was denoted as "stick-slip" in the tables reporting results. When stick-slip occurs, the average peel force generally underestimates the true bond strength. The average of the oscillating peel force is reported in the tables next to a designation of stick-slip.

When the bond between the adhesive and the substrate was stronger than the bond between the adhesive and the backing, failure occurred at the adhesive-backing interface. This was denoted in the tables reporting results as "backing separation". Under these conditions, the true bond strength is not measured but is believed to be higher than the observed removal force from the backing. The removal force was reported in the tables next to the symbol for backing separation (Sb).

Static Shear Strength

Static Shear Strength at room temperature or at 70° C. was determined as follows: Individual 2.5 cm×10 cm test samples having a layer of pressure sensitive adhesive of the invention on a 0.05 mm thick primed polyester film were bonded to a 5 cm×13 cm stainless steel panel by passing a 2 kg. rubber coated steel roller over the composite two times to form an overlap area of 2.5 cm×2.5 cm. After 1 to 24 hours dwell at room temperature (e.g. 20–25° C.), the bonded panel was clamped 2 degrees from vertical at room temperature or in an oven maintained at 70° C. with a 250 gram, 500 gram, 1000 gram, or 2000 gram weight attached to the free end of the composite. The time to failure was determined in minutes and was the average value of two replicates unless otherwise noted. If failure did not occur by 10,000 minutes, the test was discontinued.

Adhesive Composition Components

In the examples, the following components were used in the adhesive formulations:

Block Copolymers

1. Linear styrene butadiene (SB) block copolymer with 31% styrene and 15% diblock content, available from Shell Chemical Company, Houston, Tex. under the trade designation "Kraton D1101".
2. Linear styrene butadiene block copolymer with 31% styrene and 80% diblock content, available from Shell Chemical Company, Houston, Tex. under the trade designation "Kraton D1118".
3. Linear styrene isoprene (SI) block copolymer with 15% styrene and 18% diblock content, available from Shell Chemical Company, Houston, Tex. under the trade designation "Kraton D1107".
4. Linear styrene isoprene block copolymer with 22% styrene and 65% diblock content, available from Shell Chemical Company, Houston, Tex. under the trade designation "Kraton D1119".
5. Linear styrene butadiene block copolymer with 25% styrene and about 100% (not confirmed) diblock content, available from Housemex Inc., Houston, Tex., under the trade designation "Solprene 1205".
6. Linear styrene isoprene block copolymer with 15% styrene and 75% diblock content, available from available from Nippon Zeon, Tokyo, Japan under the trade designation "Quintac SL-113".

Polyphenylene Oxides

1. Polyphenylene oxide, midpoint Tg 160° C., Mw 9,200, Mn 2,770 Da, melt index 22.3 gr/10 min @ 220° C., 1 rad/s, and 5 kg; sampled from General Electric Co, Plastics Group, Pittsfield, Mass. having the designation PPO 612-111, Lot 2970059.
2. Polyphenylene oxide, midpoint Tg 170° C., Mw 13,200, Mn 2,770 Da, melt index 22.3 gr/10 min @ 220° C., 1 rad/s, and 5 kg; experimentally sampled from General Electric Co, Plastics Group, Netherlands having the designation PPO 857.

Tackifier Resins

1. Alpha-pinene resin, nominal softening point 135° C., available from Hercules Inc., Wilmington, Del. under the trade designation "Piccolyte A135".
2. Alpha-pinene resin, nominal softening point 115° C., available from Hercules Inc., Wilmington, Del. under the trade designation "Piccolyte A115".
4. Petroleum derived hydrocarbon resin, nominal softening point 97° C., available from Goodyear Tire & Rubber Co., Chemical Div, Akron Ohio under the trade designation "Wingtack Plus".
5. Alpha-pinene resin, nominal softening point 25° C., available from Arizona Chemical Division, International Paper, Panama City, Fla. under the trade designation "Zonarez A25".

End Block Associating Resin

Aromatic end-block associating resin, nominal softening point 115° C., available from Hercules Inc., Wilmington, Del. under the trade designation "Endex 160".

Oil

1. Naphthenic oil, available from Shell Chemical USA, Houston, Tex., under the trade designation "Shellflex 371N".
2. Naphthenic oil, available from Shell Chemical USA, Houston, Tex. under the trade designation "Shellflex 6371".

Additives

1. Antioxidant, available from Albemarle Corporation, Baton Rouge, La. under the trade designation "Ethanox 330".
2. Antioxidant, available from Ciba-Geigy, Ardsley, N.Y. under the trade designation "Irganox 1076".

Examples 1 to 3 (E1 to E3) and Comparative Examples 1 to 2 (CE1 to CE2)

SB and SI block copolymer based PSAs having a PPO/PS ratio of 1.0 were prepared with various amounts of diblock content as shown in Table A. The amount of PPO was added as a ratio of parts by weight PPO to parts by weight polystyrene (PS) in the adhesive (PPO/PS).

The percent diblock content based on the total amount of block copolymer component and reported in the Table A represents either the value reported by the manufacturer or obtained by calculation.

TABLE A

| Component | E1 | E2 | CE1 | CE2 | E3 |
|---|---|---|---|---|---|
| Kraton D1118 | 24.9 | 24.9 | — | — | 12.5 |
| Kraton D1101 | — | — | 24.9 | 24.9 | 12.5 |
| Quintac SL-113 | — | — | — | — | — |
| Kraton D1107 | — | — | — | — | — |
| Piccolyte A135 | 24.9 | — | 24.9 | — | 12.5 |
| Piccolyte A115 | — | 24.9 | — | 24.9 | 12.5 |
| Piccolyte S135 | — | — | — | — | — |
| Piccolyte S115 | — | — | — | — | — |
| Shellflex 371N | 8.7 | 8.7 | 8.7 | 8.7 | 8.7 |
| Ethanox 330 | 0.7 | 0.7 | 0.7 | 0.7 | 0.7 |
| PPO 612-111 | 7.5 | 7.5 | 7.5 | 7.5 | 7.5 |
| Ratio of PPO/PS | 1.0 | 1.0 | 1.0 | 1.0 | 1.0 |
| % Diblock Content | 80 | 80 | 15 | 15 | 47.5 |

The examples were prepared in toluene at approximately 47% by weight solids. All components except the PPO resin were dissolved in toluene at room temperature. The PPO resin was dissolved in toluene at room temperature at approximately 33% by weight solids and then added to the solution containing the rest of the components and stirred until a homogeneous solution resulted.

The adhesive solutions thus prepared were coated onto a 0.051 mm (2 mil) thick polyester film using a notched bar coater and dried in a vented forced air oven at 77° C. for 25 minutes.

The above test tapes were tested for 90 Degree Peel Adhesion according to the test method described above to four substrates:

(1) low density polyethylene (LDPE) obtained from Aeromat Plastics, Burnsville, Minn., which was 4.70 mm thick, 5.1 cm wide, and 12.7 cm long, (2) high density polyethylene (HDPE) obtained from Aeromat Plastics, Burnsville, Minn., which was 4.70 mm thick, 5.1 cm wide, and 12.7 cm long, (3) polypropylene (PP, obtained from Aeromat Plastics, Burnsville, Minn., which was 4.70 mm thick, 5.1 cm wide, and 12.7 cm long, and (4) stainless steel (SS) obtained from Vincent Metals, Coon Rapids, Minn., which was 1.22 mm thick, 5.1 cm wide, and 12.7 cm long.

The results represent a single test and were rounded off to three significant figures and are set forth in Table I.

TABLE I

| Substrate, Dwell Time | Peel Adhesion kN/m (lbs/in) | | | | |
|---|---|---|---|---|---|
| | E1 | E2 | CE1 | CE2 | E3 |
| SS, 1 hour | 2.00 (11.4) | 1.55 (8.8) | 0.90 (5.1) | 0.72 (4.1) | 0.98 (5.6) |
| SS, 24 hours | 1.84 (10.5) Sb | 1.40 (8.0) Sb | 0.98 (5.6) | 0.78 (4.5) | 1.05 (6.0) |
| PP, 1 hour | 0.84 (4.8) | 1.20 (6.9) | 0.73 (4.2) | 0.66 (3.8) | 0.78 (4.5) |
| PP, 24 hours | 1.93 (11.0) Sb | 1.44 (8.2) Sb | 0.93 (5.3) | 0.79 (4.5) | 1.12 (6.4) |
| LDPE, 1 hour | 0.91 (5.2) | 1.09 (6.2) | 0.55 (3.2) | 0.55 (3.2) | 0.55 (3.2) |
| LDPE, 24 hours | 1.49 (8.5) * | 1.42 (8.1) * | 0.72 (4.1) * | 0.49 (2.8) | 0.70 (4.0) |
| HDPE, 1 hour | 1.25 (7.2) | 1.56 (8.9) | 0.61 (3.5) | 0.56 (3.2) | 0.70 (4.0) |
| HDPE, 24 hours | 1.51 (8.6) * | 1.55 (8.8) Sb | 0.42 (2.4) * | 0.53 (3.0) * | 0.40 (2.3) * |

* = stick-slip
Sb = backing separation

Examples 4 to 6 (E4 to E6) and Comparative Examples 3 to 4 (CE3 to CE4)

These examples were prepared using the components of Examples 1 to 3 except that the amount of tackifier resin was increased and the amount of oil was adjusted accordingly. SB and SI block copolymer based PSAs having a PPO/PS ratio of 1.0 were prepared with various amounts of diblock content. The components and amounts used are given in Table B.

TABLE B

| Component | E4 | E5 | CE3 | CE4 | E6 |
|---|---|---|---|---|---|
| Kraton D1118 | 24.9 | 24.9 | — | — | 12.5 |
| Kraton D1101 | — | — | 24.9 | 24.9 | 12.5 |
| Piccolyte A135 | 32.1 | — | 32.1 | — | 16.0 |
| Piccolyte A115 | — | 34.9 | — | 34.9 | 17.5 |
| Shellflex 371N | 11.2 | 8.3 | 11.2 | 8.3 | 9.8 |
| Ethanox 330 | 0.7 | 0.7 | 0.7 | 0.7 | 0.7 |
| PPO 612-111 | 7.7 | 7.7 | 7.7 | 7.7 | 7.7 |
| Ratio of PPO/PS | 1.0 | 1.0 | 1.0 | 1.0 | 1.0 |
| % Diblock Content | 80 | 80 | 15 | 15 | 47.5 |

The examples were prepared in toluene as in Examples 1 to 3 except at approximately 48% by weight solids.

The adhesive solutions thus prepared were knife coated onto a 0.051 mm (2 mil) thick polyester film backing using a notched bar coater at a speed of about 0.9 meters/minute (3 ft/minute) and dried in a forced air oven having temperature zones of 65.5° C. (150° F.), 82° C. (180° F.), 87.5° C. (190° F.) to a 0.127 mm (5 mil) adhesive thickness to form a test tape.

The above test tapes were tested for 90 Degree Peel Adhesion . The results represent a single test and are given in Table II.

TABLE II

| Substrate, Dwell Time | Peel Adhesion kN/m (lbs/in) | | | | |
|---|---|---|---|---|---|
| | E4 | E5 | CE3 | CE4 | E6 |
| SS, 1 hour | 2.10 (12.0) | 1.76 (10.0) | 2.17 (12.4) | 2.08 (11.9) | 2.99 (17.1) |
| SS, 24 hours | 2.44 (13.9) Sb | 1.70 (9.7) Sb | 2.54 (14.5) | 2.59 (14.8) | 3.43 (19.6) |
| PP, 1 hour | 2.35 (13.4) | 1.99 (11.4) | 1.03 (5.9) | 0.88 (5.0) | 1.58 (9.0) |
| PP, 24 hours | 2.35 (13.4) Sb | 1.69 (9.6) Sb | 1.05 (6.0) * | 0.91 (5.2) * | 1.77 (10.1) * |
| LDPE, 1 hour | 0.14 (0.8) | 0.31 (1.8) | 0.15 (0.9) | 0.39 (2.2) | 0.09 (0.5) |
| LDPE, 24 hours | 0.08 (0.4) | 0.25 (1.4) | 0.17 (1.0) | 0.24 (1.4) | 0.07 (0.4) |
| HDPE, 1 hour | 1.44 (8.2) | 0.84 (4.8) | 0.34 (1.9) | 0.27 (1.5) | 0.48 (2.7) |
| HDPE, 24 hours | 2.36 (13.5) Sb | 1.36 (7.8) | 0.49 (2.8) * | 0.32 (1.8) * | 0.40 (2.3) * |

* = stick-slip
Sb = backing separation

Examples 7 to 12 (E7 to E12) and Comparative Examples 5 to 6 (CE5 to CE6)

SB and SI block copolymer PSAs were prepared with and without PPO. All the formulations were based on 100 parts by weight block copolymer and contained 1 part by weight Ethanox 330. The amount of PPO was added as a ratio of parts by weight PPO to parts by weight polystyrene (PS) in the adhesive (PPO/PS).

The formulations are given in Table C.

The test tapes were tested for 90 Degree Peel Adhesion according to the test method described above and Static Shear Strength using 1000 grams/6.25 sq. cm (1 sq. inch) on SS. The Static Shear Strength results are reported for five tests with the average in parenthesis. Results are given in Table III.

TABLE III

| Substrate, Dwell Time | Peel Adhesion kN/m (lbs/in) | | | | | | | |
|---|---|---|---|---|---|---|---|---|
| | E7 | E8 | E9 | CE 5 | E10 | E11 | E12 | CE6 |
| SS, 1 hour | 1.45 (8.3) | 1.28 (7.3) | 1.56 (8.9) | 1.51 (8.6) | 2.19 (12.5) | 2.03 (11.6) | 1.79 (10.2) | 2.43 (13.9) |
| SS, 24 hours | 1.58 (9.0) | 1.58 (9.0) | 1.86 (10.6) Sb | 1.72 (9.8) | 2.00 (11.4) Sb | 1.89 (10.8) Sb | 1.58 (9.0) Sb | 2.49 (14.2) Sb |
| PP, 1 hour | 1.24 (7.1) | 0.14 (5.8) | 0.67 (3.8) | 1.30 (7.4) | 0.44 (2.5) | 2.00 (11.4) | 1.68 (9.6) | 1.17 (6.7) |
| PP, 24 hours | 1.51 (8.6) | 1.35 (7.7) | 1.68 (9.6) Sb | 1.58 (9.0) Sb | 2.07 (11.8) Sb | 1.93 (11.0) Sb | 1.63 (9.3) Sb | 2.49 (14.2) Sb |
| LDPE, 1 hour | 0.93 (5.3) | 0.79 (4.5) | 0.49 (2.8) | 1.00 (5.7) | 1.94 (11.1) | 1.47 (8.4) | 0.79 (4.5) | 1.96 (11.2) |
| LDPE, 24 hours | 1.07 (6.1) | 0.91 (5.2) | 0.67 (3.8) * | 1.12 (6.4) | 1.91 (10.9) Sb | 1.84 (10.5) Sb | 1.07 (6.1) Sb | 1.84 (10.5) |
| HDPE, 1 hour | 1.10 (6.3) | 0.89 (5.1) | 0.93 (5.3) | 1.10 (6.3) | 1.98 (11.3) | 2.00 (11.4) | 1.79 (10.2) | 1.87 (10.7) |
| HDPE, 24 hours | 1.21 (6.9) | 1.09 (6.2) | 1.05 (6.0) * | 1.14 (6.5) | 2.05 (11.7) Sb | 1.91 (10.9) Sb | 1.58 (9.0) Sb | 1.86 (10.6) |
| Static Shear Strength, minutes, 70° C., 1000 grams | | | | | | | | |
| | E7 | E8 | E9 | CE 5 | E10 | E11 | E12 | CE6 |
| | 759 | 10,000 | 10,000 | 250 | 1831 | 10,000 | 10,000 | 30 |
| | 10,000 | 10,000 | 10,000 | 250 | 2566 | 10,000 | 10,000 | 35 |
| | 10,000 | 10,000 | 10,000 | 250 | 1680 | 10,000 | 10,000 | 44 |
| | 10,000 | 10,000 | 10,000 | 340 | 1955 | 10,000 | 10,000 | 44 |
| | 10,000 | 10,000 | 10,000 | 1434 | 1811 | 10,000 | 10,000 | 48 |
| | (8152) | (10,000) | (10,000) | (505) | (1969) | (10,000) | (10,000) | (40.2) |

* = stick-slip
Sb = backing separation

TABLE C

| Component | CE5 | E7 | E8 | E9 | CE6 | E10 | E11 | E12 |
|---|---|---|---|---|---|---|---|---|
| Kraton D1101 | 25.0 | 25.0 | 25.0 | 25.0 | — | — | — | — |
| Solprene 1205 | 75.0 | 75.0 | 75.0 | 75.0 | 51.2 | 51.2 | 51.2 | 51.2 |
| Kraton D1118 | — | — | — | — | 48.8 | 48.8 | 48.8 | 48.8 |
| Piccolyte A135 | 100.0 | 106.5 | 112.1 | 117.2 | 116.7 | 124.2 | 130.9 | 136.6 |
| Shellflex 371N | 20.0 | 29.1 | 36.9 | 44.3 | 24.9 | 34.0 | 42.0 | 49.0 |
| Ethanox 330 | 0.7 | 0.7 | 0.7 | 0.7 | 0.7 | 0.7 | 0.7 | 0.7 |
| PPO 612-111 | — | 13.2 | 26.4 | 39.8 | — | 13.6 | 27.3 | 41.2 |
| Ratio of PPO/PS | — | 0.5 | 1.0 | 1.5 | — | 0.5 | 1.0 | 1.5 |
| % Diblock Content | 79 | 79 | 79 | 79 | 90 | 90 | 90 | 90 |

The examples were prepared in toluene at approximately 50% by weight solids. All components except the PPO resin were dissolved in toluene at room temperature. The PPO resin was dissolved in toluene at room temperature at approximately 33% by weight solids and then added to the solution containing the rest of the components and stirred until a homogeneous solution resulted.

The adhesive solutions thus prepared were knife coated onto a 0.051 mm (2 mil) thick polyester film backing using a notched bar coater at a speed of about 0.9 meters/minute (3 ft/minute) and dried in a forced air oven having temperature zones of 65.5° C. (150° F.), 82° C. (180° F.), 87.5° C. (190° F.) to a 0.127 mm (5 mil) adhesive thickness to form a test tape.

Examples 13 to 15 (E13 to E15) and Comparative Example 7 (CE7)

SB and SIS block copolymer PSAs with decreasing amounts of diblock content were prepared by combing high diblock content copolymer with low diblock content copolymer. Formulations are presented in Table D.

TABLE D

| Component | E13 | E14 | E15 | CE7 |
|---|---|---|---|---|
| Kraton D1118 | 19.9 | 14.9 | 10.0 | 5.0 |
| Kraton D1101 | 5.0 | 10.0 | 14.9 | 19.9 |
| Piccolyte A135 | 24.9 | 24.9 | 24.9 | 24.9 |
| Piccolyte A115 | — | — | — | — |
| Shellflex 371N | 8.7 | 8.7 | 8.7 | 8.7 |
| Ethanox 330 | 0.7 | 0.7 | 0.7 | 29 |
| Piccolyte A135 | 26.4 | 26.4 | 26.4 | 26.4 |
| Shellflex 371N | 9.2 | 9.2 | 9.2 | 9.2 |
| Ethanox 330 | 0.7 | 0.7 | 0.7 | 0.7 |
| PPO 612-111 | 4.0 | 4.0 | 4.0 | 4.0 |
| Ratio of PPO/PS | 1.0 | 1.0 | 1.0 | 1.0 |
| % Diblock Content | 67 | 54 | 41 | 28 |

The examples were prepared in toluene as in Examples 1 to 3.

The adhesive solutions thus prepared were knife coated onto a 0.051 mm (2 mil) thick polyester film backing using a notched bar coater at a speed of about 0.9 meters/minute (3 ft/minute) and dried in a forced air oven having temperature zones of 65.5° C. (150° F.), 82° C. (180° F.), 87.5° C. (190° F.) to a 0.127 mm (5 mil) adhesive thickness to form a test tape.

The test tapes were tested for 90 Degree Peel Adhesion. The results represent one replicate and are given in Table IV.

TABLE IV

| Substrate, Dwell Time | Peel Adhesion kN/m (lbs/in) | | | |
|---|---|---|---|---|
| | E13 | E14 | E15 | CE7 |
| SS, 1 hour | 1.38 (7.9) | 2.07 (11.8) | 2.00 (11.4) | 1.46 (8.3) |
| SS, 24 hours | 2.70 (15.4) | 2.63 (15.0) | 2.19 (12.5) | 1.65 (9.4) |
| PP, 1 hour | 0.95 (5.4) | 1.52 (8.7) | 0.81 (4.6) | 0.93 (5.3) |
| PP, 24 hours | 1.73 (9.9) * | 1.63 (9.3) * | 1.05 (6.0) * | 0.84 (4.8) |
| LDPE, 1 hour | 0.39 (2.2) | 0.46 (2.6) | 0.44 (2.5) | 0.25 (1.4) |
| LDPE, 24 hours | 0.32 (1.8) * | 0.42 (2.4) * | 0.56 (3.2) * | 0.19 (1.1) * |
| HDPE, 1 hour | 0.44 (2.5) | 0.49 (2.8) | 0.32 (1.8) | 0.35 (2.0) |
| HDPE, 24 hours | 0.44 (2.5) * | 0.40 (2.3) * | 0.40 (2.3) * | 0.37 (2.1) * |

* = stick-slip

Examples 16 to 19 (E16 to E19) and Comparative Examples 8 to 9 (CE8 to CE9)

The effect of using a liquid tackifier resin in place of an oil was demonstrated in SIS block copolymer PSAs with varying amounts of diblock content . Formulations are presented in Table E.

TABLE E

| Component | E16 | CE8 | E17 | E18 | CE9 | E19 |
|---|---|---|---|---|---|---|
| Quintac SL-113 | 20.3 | — | 10.2 | 24.9 | — | 12.5 |
| Kraton D1107 | — | 20.3 | 10.2 | — | 24.9 | 12.5 |
| Wingtack Plus | 28.5 | 28.5 | 28.5 | 29.9 | 29.9 | 29.9 |
| Zonarez A25 | 14.2 | 14.2 | 14.2 | — | — | — |
| Shellflex 371N | — | — | — | 7.5 | 7.5 | 7.5 |
| Ethanox 330 | 0.7 | 0.7 | 0.7 | 0.7 | 0.7 | 0.7 |
| PPO 612-111 | 3.1 | 3.1 | 3.1 | 3.7 | 3.7 | 3.7 |
| Ratio of PPO/PS | 1.0 | 1.0 | 1.0 | 1.0 | 1.0 | 1.0 |
| % Diblock Content | 75 | 18 | 46.5 | 75 | 18 | 46.5 |

The examples were prepared in toluene as in Examples 1 to 3 except at approximately 50% by weight solids.

The adhesive solutions thus prepared were coated onto a 0.051 mm (2 mil) thick polyester film using a notched bar coater and dried in a vented forced air oven at 77° C. for 25 minutes.

The samples were bonded to various substrates and tested for 90 Degree Peel Adhesion as described in Examples 1 to 3. The results represent a single test and are reported in Table V.

TABLE V

| Substrate, Dwell Time | Peel Adhesion kN/m (lbs/in) | | | | | |
|---|---|---|---|---|---|---|
| | E16 | CE8 | E17 | E18 | CE9 | E19 |
| SS, 22.5 hours | 2.10 (12.0) | 1.75 (10.0) | 1.91 (10.9) | 1.44 (8.2) | 1.12 (6.4) | 1.19 (6.8) |
| PP, 22.5 hours | 1.91 (10.9) | 1.59 (9.1) | 1.79 (10.2) | 1.38 (7.9) | 1.09 (6.2) | 1.21 (6.9) |
| LDPE, 22.5 hours | 1.28 (7.3) | 1.17 (6.7) | 1.19 (6.8) | 0.82 (4.7) | 0.65 (3.7) | 0.67 (3.8) |
| HDPE, 22.5 hours | 0.84 (4.8) * | 1.05 (6.0) | 1.10 (6.3) * | 0.88 (5.0) | 0.68 (3.9) | 0.70 (4.0) |

* = stick-slip

Examples 20 to 23 (E20 to E23)

The components and their amounts for these examples are set forth in Table F. The ratio of PPO to PS is varied in these examples.

TABLE F

| Component | E20 | E21 | E22 | E23 |
|---|---|---|---|---|
| Kraton D1118 | 16.3 | 16.3 | 16.3 | 16.3 |
| Solprene 1205 | 17.0 | 17.0 | 17.0 | 17.0 |
| Piccolyte A135 | 43.6 | 43.6 | 43.6 | 43.6 |
| Endex 160 | — | 6.1 | 4.6 | 3.0 |
| Shellflex 371N | 14.0 | 14.0 | 14.0 | 14.0 |
| Irganox 1076 | 2.0 | 2.0 | 2.0 | 2.0 |
| PPO 612-111 | 9.1 | 3.0 | 4.6 | 6.1 |
| Ratio of PPO/PS | 1.00 | 0.33 | 0.50 | 0.67 |
| % Diblock Content | 90 | 90 | 90 | 90 |

The examples were prepared in toluene as in Examples 1 to 3 except at approximately 48% by weight solids.

The adhesive solutions thus prepared were knife coated onto a 0.051 mm (2 mil) thick polyester film backing using a notched bar coater at a speed of about 1.52 meters/minute (5 ft/minute) and dried in a forced air oven having temperature zones of 65.5° C. (150° F.), 82° C. (180° F.), 87.5° C. (190° F.) to a 0.05 mm (2 mil) adhesive thickness to form a test tape.

The above test tapes were tested for 90 Degree Peel Adhesion. The results represent a single test and are given in Table VI.

TABLE VI

| Substrate, Dwell Time | E20 | E21 | E22 | E23 |
|---|---|---|---|---|
| | Peel Adhesion kN/m (lbs/in) | | | |
| SS, 1 hour dwell | 1.26 (7.2) | 1.58 (9.0) | 1.47 (8.4) | 1.31 (7.5) |
| PP, 1 hour dwell | 1.17 (6.7) | 1.44 (8.2) | 1.49 (8.5) | 1.23 (7.0) |
| LDPE, 1 hour dwell | 1.21 (6.9) | 1.09 (6.2) | 1.33 (7.6) | 1.40 (8.0) |
| HDPE, 1 hour dwell | 1.26 (7.2) | 1.47 (8.4) | 1.44 (8.2) | 1.35 (7.7) |
| Static Shear Strength, minutes, 22° C., 2000 grams | | | | |
| | 10,000 | 10,000 | 10,000 | 10,000 |
| | 10,000 | 5,508 | 5,558 | 10,000 |
| | 266 | 3,694 | 427 | 394 |
| Static Shear Strength, minutes, 70° C., 500 grams | | | | |
| | 10,000 | 10,000 | 10,000 | 10,000 |
| | 10,000 | 1,015 | 1,116 | 10,000 |

Examples 24 to 31 (E24 to E31) and Comparative Example 10 (CE10)

In these examples, adhesive compositions were prepared with different PPO/PS ratios ranging from 0.0 to 0.50. The components and their amounts are set forth in Table G.

TABLE G

| Component | CE10 | E24 | E25 | E26 | E27 | E28 | E29 | E30 | E31 |
|---|---|---|---|---|---|---|---|---|---|
| Kraton D1101 | 25.0 | 25.0 | 25.0 | 25.0 | 25.0 | 25.0 | 25.0 | 25.0 | 25.0 |
| Solprene 1205 | 75.0 | 75.0 | 75.0 | 75.0 | 75.0 | 75.0 | 75.0 | 75.0 | 75.0 |
| Piccolyte A135 | 100.0 | 101.6 | 103.2 | 104.9 | 106.5 | 101.6 | 103.2 | 104.9 | 106.5 |
| Shellflex 371N | 20.0 | 22.3 | 24.6 | 26.8 | 29.1 | 22.3 | 24.6 | 26.8 | 29.1 |
| Ethanox 330 | 0.7 | 0.7 | 0.7 | 0.7 | 0.7 | 0.7 | 0.7 | 0.7 | 0.7 |
| PPO 612-111 | — | 3.3 | 6.6 | 9.9 | 13.2 | — | — | — | — |
| PPO 857 | — | — | — | — | — | 3.3 | 6.6 | 9.9 | 13.2 |
| Ratio of PPO/PS | 0.0 | 0.125 | 0.25 | 0.375 | 0.50 | 0.125 | 0.25 | 0.375 | 0.50 |
| % Diblock Content | 79 | 79 | 79 | 79 | 79 | 79 | 79 | 79 | 79 |

The examples were prepared in toluene as in Examples 1 to 3 except at approximately 48% by weight solids.

The adhesive solutions thus prepared were knife coated onto a two-sided silicone coated paper liner using a notched bar coater at a speed of about 1.52 meters/minute (5 ft/minute) and dried in a forced air oven having temperature zones of 65.5° C. (150° F.), 82° C. (180° F.), 87.5° C. (190° F.) to a 0.08 mm (3.3 mil) adhesive thickness and laminated to a 0.05 mm (2 mil) polyester film to form a test tape.

The above test tapes were tested for 90 Degree Peel Adhesion. The results represent a single test and are given in Table VII.

TABLE VII

| Substrate, Dwell Time | Peel Adhesion kN/m (lbs/in) | | | | | | | | |
|---|---|---|---|---|---|---|---|---|---|
| | E24 | E25 | E26 | E27 | E28 | E29 | E30 | E31 | CE10 |
| SS, 24 hour dwell | 0.67 (3.8) | 0.72 (4.1) | 0.72 (4.1) | 0.72 (4.1) | 0.63 (3.6) | 0.61 (3.5) | 0.61 (3.5) | 0.58 (3.3) | 0.67 (3.8) |

TABLE VII-continued

| Substrate, Dwell Time | Peel Adhesion kN/m (lbs/in) | | | | | | | | |
|---|---|---|---|---|---|---|---|---|---|
| | E24 | E25 | E26 | E27 | E28 | E29 | E30 | E31 | CE10 |
| PP, 24 hour dwell | 0.65 (3.7) | 0.68 (3.9) | 0.68 (3.9) | 0.68 (3.9) | 0.58 (3.3) | 0.61 (3.5) | 0.61 (3.5) | 0.56 (3.2) | 0.65 (3.7) |

Examples 32 to 39 (E32 to E39) and Comparative Example 11 (CE11)

The adhesive compositions of Table G were also laminated to both sides of a 0.8 mm (0.031 inch) thick, corona treated polyethylene foam having a density of 96 kg/m³ (6 lbs/ft³), available from Voltek, Lawrence, Mass. under the tradename "Volara 6TSX" using a two roll laminator. A 0.5 mm (20 mil) thick polypropylene backing was laminated to the adhesive on one side of the foam to form a test tape.

The foam test tape was then tested for 90 Degree Peel Adhesion and Static Shear Strength. Results are presented in Table VIII.

TABLE VIII

| Substrate, Dwell Time | Peel Adhesion kN/m (lbs/in) | | | | | | | | |
|---|---|---|---|---|---|---|---|---|---|
| | E32 | E33 | E34 | E35 | E36 | E37 | E38 | E39 | CE11 |
| LDPE, 24 hour dwell | 2.01 (11.5) | 1.96 (11.2) | 1.59 (9.1) | 1.93 (11.0) | 1.89 (10.8) | 2.00 (11.4) | 1.94 (11.1) | 1.86 (10.6) | 1.87 (10.7) |
| HDPE, 24 hour dwell | 2.07 (11.8) | 1.93 (11.0) | 1.84 (10.5) | 1.98 (11.3) | 1.96 (11.2) | 1.89 (10.8) | 1.98 (11.3) | 19.3 (11.0) | 2.01 (11.5) |

| Static Shear Strength, minutes, 70° C., 250 grams | | | | | | | | | |
|---|---|---|---|---|---|---|---|---|---|
| E32 | E33 | E34 | E35 | E36 | E37 | E38 | E39 | CE11 | |
| 1,648 AS | 10,000 | 10,000 | 229 AS | 5,090 AS | 1,223 AS | 3,338 AS | 10,000 | 897 CF | |
| 10,000 | 10,000 | 10,000 | 263 AS | 2,322 AS | 1,747 AS | 10,000 | 10,000 | 698 CF | |
| 10,000 | 10,000 | 10,000 | 33 AS | 10,000 | 1,323 AS | 10,000 | 10,000 | 1,037 CF | |

AS = adhesive separated from the foam tape on the stainless steel side
CF = cohesive failure

What is claimed is:

1. A pressure sensitive adhesive composition comprising
   (a) a block copolymer composition comprising
      (i) a first component having a configuration of A-B, and
      (ii) a second component having a configuration of A-B-(B-A)$_n$ where n ranges from 1 to 20,
      wherein A is an alkenyl aromatic or arene hydrocarbon polymer and B is polybutadiene, and
      wherein the first component is present in an amount ranging from about 40 weight % to about 95 weight % based on a total weight of the block copolymer composition;
   (b) a polyphenylene oxide resin; and
   (c) a tackifier resin compatible with B.

2. The pressure sensitive adhesive composition of claim 1 further comprising an aromatic hydrocarbon end block associating resin.

3. A tape comprising the pressure sensitive adhesive composition of claim 1.

4. The tape of claim 3 wherein the tape comprises a foam backing.

5. An article bearing a layer of the pressure sensitive adhesive composition of claim 1.

6. The article of claim 5 wherein the article is a mechanical fastener, molded part, or a gasket.

7. A method of bonding a substrate comprising
   (a) providing a substrate, and
   (b) applying an adhesive composition of claim 1 to the substrate.

8. The method of claim 7 further comprising contacting another substrate to the adhesive composition.

9. The method of claim 7 wherein the substrate is unmodified.

10. The method of claim 7 wherein the substrate is a low surface energy substrate.

11. The pressure sensitive adhesive composition of claim 1 wherein the polyphenylene oxide resin is present in an amount ranging from about 10 to about 200 parts, based on 100 parts by weight of block A, in the block copolymer composition.

12. A pressure sensitive adhesive composition comprising
    (a) a block copolymer composition comprising
       (i) a first component having a configuration of A-B, and
       (ii) a second component having a configuration of A-B-(B-A)$_n$ where n ranges from 1 to 20,
       wherein A is an alkenyl aromatic or arene hydrocarbon polymer and B is polyisoprene, and
       wherein the first component is present in an amount ranging from about 40 weight % to about 95 weight % based on a total weight of the block copolymer composition;
    (b) a polyphenylene oxide resin; and
    (c) a petroleum derived hydrocarbon tackifier resin compatible with B.

13. The pressure sensitive adhesive composition of claim 12 further comprising an aromatic hydrocarbon end block associating resin.

14. A tape comprising the pressure sensitive adhesive composition of claim 12.

15. The tape of claim 14 wherein the tape comprises a foam backing.

16. An article bearing a layer of the pressure sensitive adhesive composition of claim 12.

17. The article of claim 16 wherein the article is a mechanical fastener, molded part, or a gasket.

18. A method of bonding a polyolefin substrate comprising
    (a) providing a polyolefin substrate, and
    (b) applying an adhesive composition of claim 12 to the substrate.

19. The method of claim 18 further comprising contacting another substrate to the adhesive composition.

20. The method of claim 18 wherein the polyolefin substrate is unmodified.

21. The method of claim 18 wherein the substrate is a low surface energy substrate.

22. The pressure sensitive adhesive composition of claim 12 wherein the polyphenylene oxide resin is present in an amount ranging from about 10 to about 200 parts, based on 100 parts by weight of block A, in the block copolymer composition.

23. The pressure sensitive adhesive composition of claim 12 wherein the B blocks include a minor proportion of monomers other than those included in polyisoprene.

24. The pressure sensitive adhesive composition of claim 12 wherein the B blocks include less than about 10 weight % of monomers other than those included in polyisoprene.

* * * * *